US008955500B2

(12) United States Patent
Spix et al.

(10) Patent No.: US 8,955,500 B2
(45) Date of Patent: Feb. 17, 2015

(54) POSITIVE CRANKCASE VENTILATION SYSTEM

(71) Applicant: GM Global Technology Operations, LLC, Detroit, MI (US)

(72) Inventors: Thomas A. Spix, Rochester Hills, MI (US); Ronald J. Pierik, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 13/782,243

(22) Filed: Mar. 1, 2013

(65) Prior Publication Data

US 2014/0246002 A1 Sep. 4, 2014

(51) Int. Cl.
*F01M 13/04* (2006.01)

(52) U.S. Cl.
USPC .......................................................... 123/572

(58) Field of Classification Search
USPC ................................................. 123/572–574
IPC .................................. F02M 25/06; B60T 17/00
See application file for complete search history.

(56) References Cited

U.S. PATENT DOCUMENTS

| 3,157,169 | A | * | 11/1964 | Drysdale | 123/572 |
| 3,246,639 | A | * | 4/1966 | Oliver | 123/572 |
| 4,711,224 | A | * | 12/1987 | Eckhardt | 123/572 |
| 5,603,290 | A | * | 2/1997 | Swain et al. | 123/41.86 |
| 6,920,869 | B2 | * | 7/2005 | Murata et al. | 123/572 |
| 8,640,680 | B2 | * | 2/2014 | Pursifull | 123/572 |
| 2010/0031904 | A1 | * | 2/2010 | Matsuura et al. | 123/41.86 |
| 2011/0030658 | A1 | * | 2/2011 | Ulrey et al. | 123/521 |
| 2013/0129475 | A1 | * | 5/2013 | Ries-Mueller | 415/1 |
| 2013/0146039 | A1 | * | 6/2013 | Pursifull | 123/572 |

* cited by examiner

*Primary Examiner* — M. McMahon
(74) *Attorney, Agent, or Firm* — Cantor Colburn LLP

(57) ABSTRACT

A positive crankcase ventilation system for an internal combustion engine (ICE) includes an engine crankcase, an intake manifold disposed in downstream gas flow communication with the engine crankcase, an air induction system disposed in upstream gas flow communication with the engine crankcase, and a vacuum pump disposed in gas flow communication between the air induction system and the engine crankcase. Operation of the vacuum pump facilitates air flow from the air induction system to the engine crankcase, and from the engine crankcase to the intake manifold.

16 Claims, 1 Drawing Sheet

POSITIVE CRANKCASE VENTILATION SYSTEM

FIELD OF THE INVENTION

The subject invention relates generally to internal combustion engines, and more specifically to a positive crankcase ventilation system for an internal combustion engine.

BACKGROUND

Blow-by gases from engine combustion tend to seep past an engine's piston rings and work their way into the engine's crankcase. Positive crankcase ventilation (PCV) involves recycling these blow-by gases through a valve, called a PCV valve, to the intake manifold where they are pumped back into the cylinders for another opportunity at combustion. When an engine is idling the air pressure in the intake manifold is lower than the air pressure in the crankcase, and it is this lower pressure that draws the blow-by gases through the PCV valve and into the intake manifold. As the engine load increases, the air pressure in the intake manifold increases and there is less suction, reducing the amount of blow-by gases recycled to the cylinders.

In highly efficient and highly loaded internal combustion engines designed to operate with reduced pumping losses, the intake manifold pressure can be very close to atmospheric pressure, resulting in substantially reduced intake vacuum that is too low for efficient operation of a conventional PCV system.

Accordingly, it is desirable to provide a positive crankcase ventilation system for efficiently purging blow-by gases from the crankcase of an internal combustion engine designed to operate with substantially reduced intake vacuum.

SUMMARY OF THE INVENTION

In one exemplary embodiment of the invention a positive crankcase ventilation system for an internal combustion engine (ICE) includes an engine crankcase, an intake manifold disposed in downstream gas flow communication with the engine crankcase, an air induction system disposed in upstream gas flow communication with the engine crankcase, and a vacuum pump disposed in gas flow communication between the air induction system and the engine crankcase. Operation of the vacuum pump facilitates air flow from the air induction system to the engine crankcase, and from the engine crankcase to the intake manifold.

In another exemplary embodiment of the invention a vehicle includes a chassis and an internal combustion engine (ICE) supported by the chassis. The ICE includes an engine crankcase, an intake manifold disposed in downstream gas flow communication with the engine crankcase, an air induction system disposed in upstream gas flow communication with the engine crankcase, and a vacuum pump disposed in gas flow communication between the air induction system and the engine crankcase. Operation of the vacuum pump facilitates air flow from the air induction system to the engine crankcase, and from the engine crankcase to the intake manifold.

The above features and advantages and other features and advantages of the invention are readily apparent from the following detailed description of the invention when taken in connection with the accompanying drawings.

BRIEF DESCRIPTION OF THE DRAWING

Other features, advantages and details appear, by way of example only, in the following detailed description of embodiments, the detailed description referring to the drawings in which.

DESCRIPTION OF THE EMBODIMENTS

Figure 1:
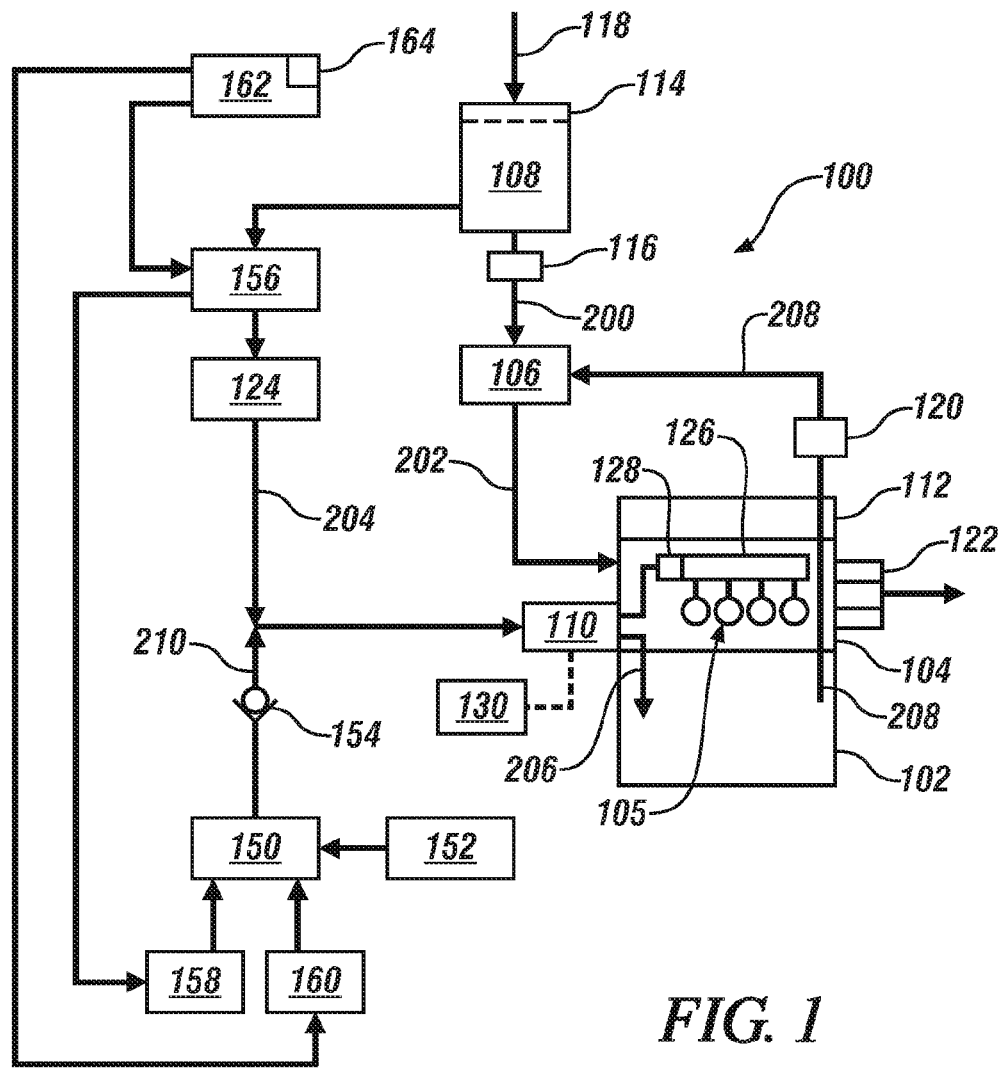
FIG. 1 depicts in block diagram form a positive crankcase ventilation system in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, and with reference to FIG. 1, an internal combustion engine (ICE) 100 includes an engine crankcase 102, a combustion chamber 104, an intake manifold 106, an air induction system 108, and a vacuum pump 110. The combustion chamber 104 typically includes cylinders, pistons, and intake and exhaust valves, which are collectively herein referred to by reference numeral 105. The air induction system 108 is disposed in upstream gas flow communication with the intake manifold 106 via gas flow passage 200, and the intake manifold 106 is disposed in upstream gas flow communication with the combustion chamber 104 via gas flow passage 202, which in combination serves to provide air for combustion. The air induction system 108 is also disposed in upstream gas flow communication with the vacuum pump 110 via gas flow passage 204, and the vacuum pump 110 is disposed in upstream gas flow communication with the engine crankcase 102 via gas flow passage 206. The intake manifold 106 is also disposed in downstream gas flow communication with the engine crankcase 102 via gas flow passage 208, which in an embodiment includes passages through a cylinder head of combustion chamber 104, and through a cylinder head cover 112.

Air for combustion passes from the air induction system 108 to the combustion chamber 104 via intake manifold 106 and gas flow passages 200 and 202. Gas flow passage 208 enables blow-by gases to pass from the engine crankcase 102 to the intake manifold 106 under a condition when the internal gas pressure in the engine crankcase 102 is greater than the internal gas pressure in the intake manifold 106. The vacuum pump 110 serves to provide a flow of fresh air to the engine crankcase 102 and to elevate the internal gas pressure in the engine crankcase 102 under a condition where the intake manifold 106 does not create sufficient vacuum to draw the blow-by gases out of the engine crankcase 102 via gas flow passage 208. In an embodiment, the vacuum pump 110 is configured to elevate the internal gas pressure in the engine crankcase 102 by as much as 2-3 kPa (kilopascals) above atmospheric gas pressure.

In an embodiment, the air induction system 108 includes an air filter 114. The air filter 114 is disposed and configured to receive and filter fresh ambient air 118. In an embodiment, a mass air flow (MAF) sensor 116 may be disposed and configured to sense a mass flow of air downstream of the air induction system 108.

In an embodiment, a positive crankcase ventilation (PCV) valve 120 is disposed in the gas flow passage 208 in gas flow communication between the engine crankcase 102 and the intake manifold 106. The PCV valve 120 is configured to regulate gas flow from the engine crankcase 102 to the intake manifold 106.

An exhaust manifold 122 serves to exhaust post-combustion gases from the combustion chamber 104.

In an embodiment, a flow control apparatus 124 may be disposed in upstream gas flow communication with the vacuum pump 110 and in downstream gas flow communication with the air induction system 108. The flow control apparatus 124 is configured to limit a mass flow of air from the vacuum pump 110 into the engine crankcase 102 to a threshold value, which in an embodiment is 15-30 liters per minute. In an embodiment, the flow control apparatus 124 may be an appropriately sized orifice, a PCV valve, a PCV nozzle, or any other flow control device suitable for a purpose disclosed herein, which may be disposed within the gas flow passage 204 or in any other convenient location suitable for a purpose disclosed herein.

In an embodiment, the vacuum pump 110 is disposed and configured to run continuously when the ICE 100 is running continuously, that is, when the pistons of the combustion chamber 104 are running continuously. In an embodiment, this continuous operation is accomplished via a camshaft 126 of the ICE 100. In a manner known in the art, the camshaft 126 operates the intake/exhaust valves of the combustion chamber 104 in operable synchronization with a crankshaft of the ICE 100 that operates the pistons of the combustion chamber 104. However, in an embodiment of the invention camshaft 126 includes an extra cam lobe 128, and the vacuum pump 110 is disposed in operable communication with this extra cam lobe 128 such that continuous operation of the camshaft 126 facilitates continuous operation of the vacuum pump 110. In an alternative embodiment, the vacuum pump 110 may be continuously or selectively operated via an electrically driven motor 130 that receives electrical power from the electrical system of the vehicle in which the ICE 100 is disposed.

In an embodiment, a vacuum assist brake booster (VABB) 150 is disposed in upstream gas flow communication with the vacuum pump 110. The vacuum pump 110 is configured to purge air from the VABB 150 on demand, such as when operation of power assist brakes 152 depletes operable vacuum therein. A check valve 154 is disposed in the vacuum line 210 between the VABB 150 and the vacuum pump 110 to prevent back flow and loss of vacuum in the VABB 150. A solenoid driven valve 156 is disposed in gas flow communication between the vacuum pump 110 and the air induction system 108, and in gas flow communication between the VABB 150 and the air induction system 108.

Sensing of pressure in the VABB 150 enables timely opening of the solenoid driven valve 156 to provide air flow from the air induction system 108 through the vacuum pump 110 to the engine crankcase 102 when the VABB 150 has an operable vacuum above a first threshold value. This sensing may be accomplished in several ways.

In one embodiment, a pressure switch 158 is disposed in operable communication with the VABB 150 and the solenoid driven valve 156. The pressure switch 158 is configured to turn on to provide operable voltage to the solenoid driven valve 156 when the VABB 150 has an operable vacuum above the first threshold value, and to turn off to disconnect operable voltage from the solenoid driven valve 156 when the VABB 150 has a vacuum below a second threshold value. The first and second threshold values may be the same value or may be different values. When the solenoid driven valve 156 is on and the vacuum pump 110 is running, air flow passes from the air induction system 108, through the solenoid driven valve 156, through the vacuum pump 110, and into the engine crankcase 102. While not specifically illustrated, it will be appreciated that the above described operational voltage may be provided by the electrical system of the vehicle in which the ICE 100 is disposed.

In another embodiment, a pressure sensor 160 is disposed in signal communication with the VABB 150 and an electronic control module (ECM) 162 of the vehicle in which the ICE 100 is disposed. The ECM 162 is disposed in operable communication with the solenoid driven valve 156. The ECM is configured, via a programmed microprocessor 164, to turn on the solenoid driven valve 156 when the pressure sensor 160 provides a signal indicative of the VABB 150 having an operable vacuum above the first threshold value, and to turn off the solenoid driven valve 156 when the pressure sensor 160 provides a signal indicative of the VABB 150 having a vacuum below the second threshold value. As discussed above, when the solenoid driven valve 156 is on and the vacuum pump 110 is running, air flow passes from the air induction system 108, through the solenoid driven valve 156, through the vacuum pump 110, and into the engine crankcase 102.

In yet another embodiment, both the pressure switch 158 and the pressure sensor 160 may be employed, thereby providing a robust PCV system having design redundancy.

Figure 2:
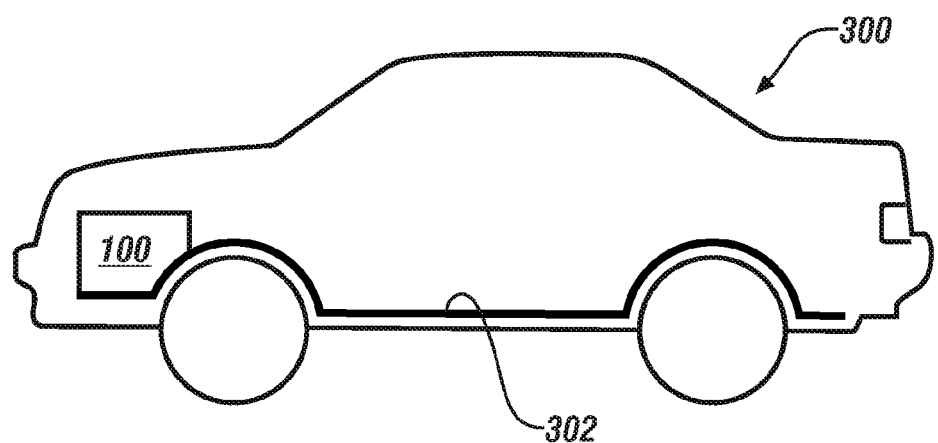
FIG. 2 is a schematic illustration of a vehicle having the positive crankcase ventilation system of FIG. 1 in accordance with an embodiment of the invention.

In view of the foregoing, and with reference to FIG. 2, it will be appreciated that the ICE 100 having a crankcase 102 ventilated in the manner described above may be disposed on a chassis 302 of a vehicle 300, which may be any vehicle, such as but not limited to a car, a sport utility vehicle, a truck, a bus or a commercial vehicle, for example, that is operably suited to be propelled by the ventilated ICE 100 in accordance with an embodiment of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A positive crankcase ventilation system for an internal combustion engine (ICE), the system comprising:
    an engine crankcase;
    an intake manifold disposed in downstream gas flow communication with the engine crankcase;
    an air induction system disposed in upstream gas flow communication with the engine crankcase; and
    a vacuum pump disposed in gas flow communication between the air induction system and the engine crankcase;
    wherein operation of the vacuum pump facilitates air flow from the air induction system to the engine crankcase, and from the engine crankcase to the intake manifold.

2. The system of claim 1 wherein:
    the vacuum pump is disposed and configured to run continuously when the ICE is running continuously.

3. The system of claim 1 wherein the ICE comprises a camshaft, and further wherein:
    the vacuum pump is disposed in operable communication with the camshaft such that continuous operation of the camshaft facilitates continuous operation of the vacuum pump.

4. The system of claim 1, further comprising:
a flow control apparatus disposed upstream of the vacuum pump, and configured to limit a mass airflow into the engine crankcase to a threshold value.

5. The system of claim 4, wherein:
the threshold value is between 15-30 liters per minute.

6. The system of claim 1, further comprising:
a vacuum assist brake booster disposed in upstream gas flow communication with the vacuum pump, the vacuum pump configured to purge air from the vacuum assist brake booster on demand;
a solenoid driven valve disposed in gas flow communication between the vacuum pump and the air induction system, and in gas flow communication between the vacuum assist brake booster and the air induction system; and
a pressure switch disposed in operable communication with the vacuum assist brake booster, the pressure switch configured to turn on to provide operable voltage to the solenoid driven valve when the vacuum assist brake booster has an operable vacuum above a first threshold value, and to turn off to disconnect operable voltage from the solenoid driven valve when the vacuum assist brake booster has a vacuum below a second threshold value;
wherein air flow passes from the air induction system, through the solenoid driven valve, through the vacuum pump, and into the engine crankcase, when the solenoid driven valve is on and the vacuum pump is running.

7. The system of claim 6, further comprising:
a flow control apparatus disposed between the vacuum pump and the air induction system, the flow control apparatus being configured to limit a mass airflow into the engine crankcase to a threshold value.

8. The system of claim 7, wherein:
the flow control apparatus comprises an orifice, and the threshold value is between 15-30 liters per minute.

9. The system of claim 1, further comprising:
a vacuum assist brake booster disposed in upstream gas flow communication with the vacuum pump, the vacuum pump configured to purge air from the vacuum assist brake booster on demand;
a solenoid driven valve disposed in gas flow communication between the vacuum pump and the air induction system, and in gas flow communication between the vacuum assist brake booster and the air induction system;
a pressure sensor disposed in signal communication with the vacuum assist brake booster; and
an electronic control module (ECM) disposed in operable communication with the pressure sensor and the solenoid driven valve, wherein the ECM is configured to turn on the solenoid driven valve when the pressure sensor provides a signal indicative of the vacuum assist brake booster having an operable vacuum above a first threshold value, and to turn off the solenoid driven valve when the pressure sensor provides a signal indicative of the vacuum assist brake booster having a vacuum below a second threshold value;
wherein air flow passes from the air induction system, through the solenoid driven valve, through the vacuum pump, and into the engine crankcase, when the solenoid driven valve is on and the vacuum pump is running.

10. The system of claim 9, further comprising:
a flow control apparatus disposed between the vacuum pump and the air induction system, the flow control apparatus being configured to limit a mass airflow into the engine crankcase to a threshold value.

11. The system of claim 10, wherein:
the flow control apparatus comprises an orifice, and the threshold value is between 15-30 liters per minute.

12. The system of claim 1, further comprising:
a positive crankcase ventilation (PCV) valve disposed in gas flow communication between the engine crankcase and the intake manifold;
wherein the PCV valve permits a regulated gas flow from the engine crankcase to the intake manifold when the engine crankcase has a higher gage pressure relative to the intake manifold.

13. The system of claim 1, wherein:
the vacuum pump is disposed and configured to be continuously or selectively operated via an electrically driven motor.

14. A vehicle, comprising:
a chassis;
an internal combustion engine (ICE) supported by the chassis, wherein the ICE comprises:
an engine crankcase;
an intake manifold disposed in downstream gas flow communication with the engine crankcase;
an air induction system disposed in upstream gas flow communication with the engine crankcase; and
a vacuum pump disposed in gas flow communication between the air induction system and the engine crankcase;
wherein operation of the vacuum pump facilitates air flow from the air induction system to the engine crankcase, and from the engine crankcase to the intake manifold.

15. The vehicle of claim 14 wherein:
the vacuum pump is disposed and configured to run continuously when the ICE is running continuously.

16. The vehicle of claim 14, wherein:
the vacuum pump is disposed and configured to be continuously or selectively operated via an electrically driven motor.

* * * * *